US008888276B2

(12) United States Patent
Kurtin et al.

(10) Patent No.: US 8,888,276 B2
(45) Date of Patent: Nov. 18, 2014

(54) ROTARY ACTUATION MECHANISM FOR VARIABLE FOCUS SPECTACLES

(71) Applicant: Zoom Focus Eyewear LLC, Van Nuys, CA (US)

(72) Inventors: Stephen Kurtin, Sherman Oaks, CA (US); Terence J. Villalovos, Simi Valley, CA (US); Daniel E. Fedele, Simi Valley, CA (US); James G. Coates, Sun Valley, CA (US)

(73) Assignee: Zoom Focus Eyewear LLC, Van Nuys, CA (US)

( * ) Notice: Subject to any disclaimer, the term of this patent is extended or adjusted under 35 U.S.C. 154(b) by 32 days.

(21) Appl. No.: 13/736,532

(22) Filed: Jan. 8, 2013

(65) Prior Publication Data

US 2013/0176528 A1    Jul. 11, 2013

Related U.S. Application Data

(60) Provisional application No. 61/584,269, filed on Jan. 8, 2012.

(51) Int. Cl.
*G02C 5/04* (2006.01)
*G02C 7/08* (2006.01)

(52) U.S. Cl.
CPC ....... *G02C 7/088* (2013.01); *G02C 5/04* (2013.01); *G02C 7/081* (2013.01)
USPC .......................... 351/158; 351/128; 359/699

(58) Field of Classification Search
CPC ............ G02C 5/02; G02C 5/04; G02C 5/045; G02C 5/10

USPC .......... 351/124, 125, 128, 148, 158; 359/694, 359/699–701

See application file for complete search history.

(56) References Cited

U.S. PATENT DOCUMENTS

| | | | | |
|---|---|---|---|---|
| 3,754,298 A | * | 8/1973 | Menil | 15/250.3 |
| 4,080,043 A | | 3/1978 | Altenheiner et al. | |
| 5,138,494 A | | 8/1992 | Kurtin | |
| 5,371,629 A | | 12/1994 | Kurtin et al. | |
| 5,526,067 A | * | 6/1996 | Cronin et al. | 351/41 |
| 5,663,779 A | * | 9/1997 | Karasawa | 351/49 |
| 5,668,620 A | | 9/1997 | Kurtin et al. | |

(Continued)

OTHER PUBLICATIONS

International Search Report and Written Opinion in counterpart PCT application No. PCT/US2013/020661, dated Mar. 15, 2013.

*Primary Examiner* — Darryl J Collins
(74) *Attorney, Agent, or Firm* — Chen Yoshimura LLP

(57) ABSTRACT

A rotary actuation mechanism for variable focus spectacles is disclosed. The spectacles include two variable focus lens units and a bridge therebetween. The actuation mechanism includes a rotary cam rotatably mounted on the bridge, a fingerwheel attached to the rotary cam to rotate it, a cam follower disposed in slidable contact with the peripheral surface of the rotary cam, and two elongated couplers pivotally mounted on the bridge. The peripheral surface of the rotary cam is spiral shaped to transfer the rotation of the rotary cam into a linear, or pivoting, motion of the cam follower. Each coupler has a proximate end in contact with or attached to the cam follower and a distal end coupled to a linkage anchor of a respective lens unit, to transfer the motion of the cam follower into simultaneous pivoting motions of the linkage anchors thereby adjusting the focal lengths of the lens units.

15 Claims, 3 Drawing Sheets

(56) References Cited

U.S. PATENT DOCUMENTS

| | | | |
|---|---|---|---|
| 5,790,225 A | * | 8/1998 | Flados .......................... 351/49 |
| 5,841,506 A | * | 11/1998 | Karasawa et al. ............... 351/47 |
| 6,053,610 A | | 4/2000 | Kurtin et al. |
| 7,008,054 B1 | | 3/2006 | Kurtin et al. |
| 7,866,816 B2 | | 1/2011 | Kurtin |
| 2010/0277686 A1 | * | 11/2010 | Kurtin .......................... 351/154 |

* cited by examiner

ROTARY ACTUATION MECHANISM FOR VARIABLE FOCUS SPECTACLES

BACKGROUND OF THE INVENTION

1. Field of the Invention

This invention relates to variable focus spectacles and, in particular, it relates to an actuation mechanism for simultaneously adjusting the optical powers of each of the two lens units in a pair of variable focus spectacles.

2. Description of the Related Art

Variable focus spectacles are spectacles with adjustable optical power (i.e., adjustable focal length) in one or both lens units. Various mechanisms for changing the focal length of variable focus spectacles have been disclosed. For example, U.S. Pat. Nos. 5,138,494, 5,371,629 and 5,668,620 describe a variable focal length lens, for use in spectacles, which includes one or two rigid lenses to provide the wearer's distance correction, and a liquid filled lens bounded by a distensible elastomeric membrane to provide a variable optical power. The liquid, which has a fixed volume, is stored in the field of view between the elastomeric membrane and one of the rigid lenses. Variation of the optical power of the liquid filled lens is achieved by displacement of the outer periphery of the stretched elastomeric membrane or a membrane support or other parts.

U.S. Pat. No. 7,866,816 describes variable focus spectacles which comprise i) a focus module that includes two variable focus lens sections, said sections each including a first fixed lens and an adjustable focus liquid lens, and ii) a second fixed lens that preferably includes most or all of the optical power needed by the intended wearer to correct his/her distance vision. The second fixed lens is preferably attached to the focus module by magnetic attraction.

U.S. Pat. No. 6,053,610 describes an actuating mechanism for spectacles which include two variable focal length lens units. Each lens unit is fitted with a coupling member which extends from the lens unit into the bridge of the spectacles. A linearly-movable finger-operated slider, having a finger pad extending above the bridge, causes a cam within the bridge to pivot as it is moved, the cam being coupled to the coupling members causing them to move and the focal length of the lens units thereby to change.

U.S. Pat. No. 7,008,054 describes an actuating mechanism for spectacles which include two variable focus lens units. The mechanism mounts on the spectacle bridge; and includes two elongated drive levers mounted near opposite ends of the bridge, each extending toward the other end of the bridge. The free end of each driving lever is connected to its corresponding lens unit through a linkage. The driving levers are caused to rotate simultaneously, but in opposite directions, by a cam that is driven by a sliding member that slides along the bridge. By positioning the sliding member as desired, the spectacles wearer causes the cam to rotate, thereby causing the driving levers to rotate, and both lens units to change focal length. This actuation mechanism enables simultaneously controlling the optical powers of both lend units of the spectacles.

SUMMARY OF THE INVENTION

While the linear actuation mechanism described in U.S. Pat. No. 7,008,054 offers many benefits, it i) has proven relatively expensive to manufacture, ii) does not always provide smooth operation; iii) can, in use, become hindered by an accumulation of detritus, and iv) is very sensitive to proper positioning of one pivot pin. This actuation mechanism is "linear" because, although a cam pivots about an internal pivot, the user moves a slider with a straight-line, linear, back-and-forth motion.

Accordingly, the present invention is directed to an improved actuation mechanism for simultaneously adjusting the optical powers of each of the two lens units in a pair of variable focus spectacles.

The actuation mechanism according to embodiments of the present invention is inherently rotary. In operation the user touches an exposed portion of a fingerwheel. A spiral cam surface, directly connected to the fingerwheel, transforms a torque applied by the user's finger into suitably controlled actuation of two variable focus lens units.

An object of the present invention is to an actuation mechanism for variable focus spectacles that operates uniformly and reliably, is relatively inexpensive to manufacture, and easy to use.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an actuation mechanism for spectacles, the spectacles including two variable focus lens units and a bridge therebetween, each variable focus lens unit having a linkage anchor, the actuation mechanism including: a rotary cam rotatably mounted on the bridge, the rotary cam having a spiral shaped peripheral surface; a cam follower disposed in slidable contact with the peripheral surface of the rotary cam; and first and second elongated couplers, each pivotally mounted on the bridge, each having a proximate end engaged with the cam follower and a distal end coupled to the linkage anchor of a corresponding one of the lens units.

The actuation mechanism may further include a fingerwheel affixed to and rotatable with the rotary cam. The peripheral surface of the rotary cam may have a plurality of indentations separated by a plurality of raised ridges. The peripheral surface of the rotary cam may further include a protrusion located near a far end of the spiral shaped peripheral surface, which engages the cam follower or the proximate end of one of the first and second couplers when the rotary cam is rotated to an extreme position to prevent over-rotation of the rotary cam. The cam follower may be attached to the proximate end of the first coupler, and the proximate end of the second coupler may rest slidably on the cam follower.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
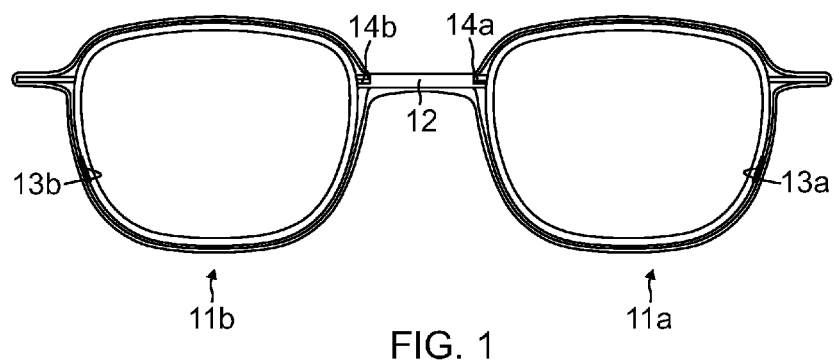
FIG. 1 is a rear view of a pair of spectacles including two variable focus lens units and an actuator.

FIG. 1 shows a rear view of a pair of variable focus spectacles in which embodiments of the invented actuation mechanism may be implemented. The spectacles include two lens units 11a and 11b connected by a bridge 12. The actuator according to embodiments of the present invention would be contained in the bridge 12. The bridge 12 may have any suitable shape. The actuator is not show in FIG. 1. Further, the sizes of various parts shown in FIG. 1 is are not intended to be proportional; for example, the bridge may be actually thicker than that shown in FIG. 1 to accommodate the actuator structure. Only so much of the construction and operation of the lens units as is deemed necessary for an understanding of the invention is included herein, but further constructional details and an explanation of lens unit operation can be found in, for example, U.S. Pat. Nos. 5,138,494, 5,371,629, and 5,668,620 mentioned above. In the descriptions below, the directions are from the perspective of the wearer. In particular, "forward" and "rearward" refers to directions away from or toward the face of the wearer.

Each lens unit 11a, 11b contains a first ring assembly (e.g. a front ring assembly) that is attached to the bridge 12, and a second ring assembly (e.g. a rear ring assembly) hingedly attached to the first ring assembly, for example by leaf hinges 13a, 13b. The first and second ring assemblies substantially overlap with each other in the rear view, and an optical fluid is disposed between them. As explained in the above-referenced patents, the focal length of each lens unit 11a, 11b is changed by adjusting the distance between the respective first and second ring assemblies. In the embodiment illustrated in FIG. 1, the hinges 13a and 13b are located at two sides of the spectacles, approximately diagonally across each lens unit from the bridge 12. Linkage anchors 14a and 14b are respectively attached to the second ring assemblies of the lens units 11a and 11b, at locations near where the bridge 12 is attached to the lens units 11a and 11b. Each of the linkage anchors 14a and 14b is coupled to the actuator (not shown in FIG. 1), and can be moved by the actuator in the forward-rearward direction to change the distance between the first and second ring assemblies of the corresponding lens unit and therefore the focal length of that lens unit.

Figure 2:
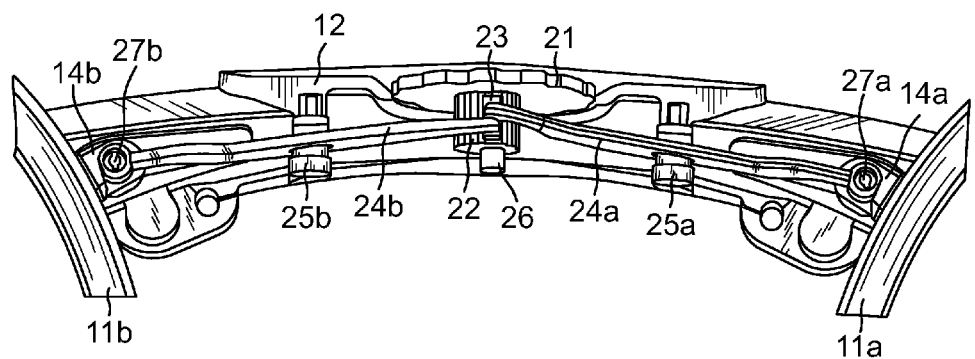
FIG. 2 is a rear view of the spectacles showing an actuator mechanism according to an embodiment of the present invention.
Figure 3:
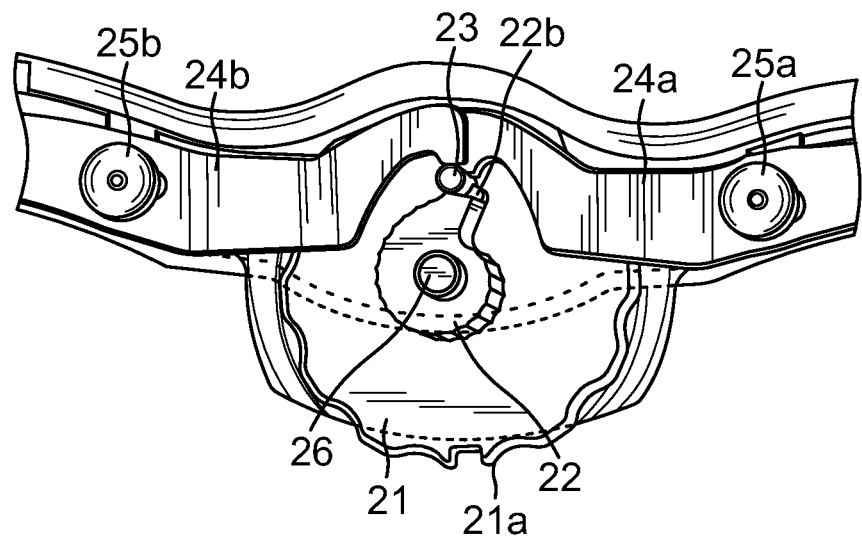
FIG. 3 is a bottom view of the of the actuator mechanism of FIG. 2.

The structure of the actuator is described with reference to FIGS. 2-4. FIG. 2 is a rear view of the spectacles showing a fraction of each lens unit 11a, 11b, the bridge 12 (some parts of the bridge is removed for clarity), and the actuator and related structures in the bridge. The bridge 12 may have any suitable shape, so long as it adequately forms a support structure that holds and positions the two lens units 11a, 11b and the actuator structure as described in more detail below. FIG. 3 is an enlarged bottom view showing a portion of the actuator and the bridge.

As shown in FIGS. 2-3, the actuator includes a manually operable fingerwheel 21, a rotary cam 22, a cam follower 23, first and second couplers 24a and 24b, and first and second coupler pivots 25a and 25b. The fingerwheel 21 is shaped as a short cylinder, preferably with depressions on its exterior, intended to be rotated by the user's finger. A part of the fingerwheel is exposed by the bridge, e.g., at a location in the front of the spectacle and centered along the bridge, for access by the user's finger. The rotary cam 22 is affixed to the fingerwheel 21 and rotates with it. The fingerwheel 21 and the rotary cam 22 form a rotary cam assembly, which has a through hole (hub) 22a along its rotational axis, as shown in FIG. 4. The rotary cam assembly 21/22 may be machined or molded as a single piece, or it may be formed of two pieces affixed to each other. A bearing shaft 26 mounted in the bridge 12, in the up-down direction at approximately the center of the bridge, extends in the through hole of the rotary cam assembly 21/22 to provide rotational bearing support for the rotary cam assembly.

Figure 4:
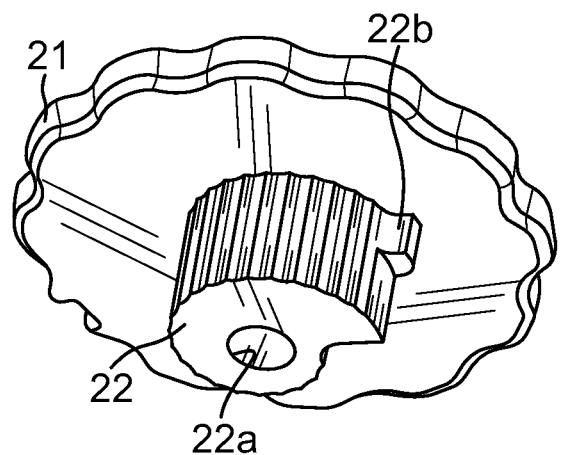
FIG. 4 illustrates the rotary cam assembly according to an embodiment of the present invention.

The peripheral surface of the rotary cam 22 generally has a spiral shape when viewed along the direction of the rotation axis of the cam, as shown in FIGS. 3 and 4. In other words, the radial distance from the peripheral surface to the rotation axis generally increases/decreases with the rotation angle. The cam follower 23 is a pin (cylindrical, or other suitable shapes) disposed along and in contact with the peripheral surface of the rotary cam 22. As the rotary cam 22 rotates, the cam follower 23 slides on the rotary cam, thereby coupling the rotation of the rotary cam into a linear, or pivoting, motion (in the forward-rearward direction) of the cam follower.

Each coupler 24a, 24b is an elongated element extending generally along the bridge 12 and pivotally coupled to the bridge by respective first and second coupler pivots 25a, 25b, which are located between the proximate and distal ends of the respective couplers. The proximate ends of the couplers 24a, 24b are in contact with the cam follower 23; the distal ends of the couplers are respectively coupled to the linkage anchors 14a and 14b. As the cam follower 23 moves in the forward-rearward direction, the couplers 24a, 24b pivot around their pivotal axes defined by the coupler pivots 25a and 25b (which are parallel to the rotation axis of the rotary cam assembly, i.e. in the up-down direction), thereby coupling the linear motion of the cam follower into simultaneous displacement (in the forward-rearward direction) of the linkage anchors 14a and 14b. This in turn causes the respective second ring assemblies of the lens units 11a and 11b to pivot relative to the first ring assemblies about the leaf hinges 13a and 13b, which results in changes the focal lengths of the first and second lens units 11a and 11b.

The second ring assemblies of the lens units 11a and 11b are urged by forces arising from tension in the film bounding the front of each lens unit in a direction that, via the linkage anchors 14a, 14b, urges the proximate ends of the two couplers 24a, 24b to push the cam follower 23 against the peripheral surface of the rotary cam 22.

The shape of the rotary cam 22, including its maximum rise, together with the length of the couplers 24a, 24b, and the locations of the coupler pivots 25a, 25b determine the amount of pivoting of the second ring assemblies of the lens units. These components are designed such that the rotation of the rotary cam 22 drives a specific displacement of the linkage anchors 14a, 14b, thereby providing the desired focal length adjustment of the two lens units. As the rotary cam assembly is located approximately at the center of the bridge, the two couplers are approximately of equal length and the two coupler pivots are located at approximately symmetrical positions, the displacement of the linkage anchors 14a and 14b are approximately equal.

Optionally, a coupler nut and an adjusting screw are provided for coupling the distal end of each coupler 24a, 24b to the respective linkage anchors and for tuning the optical set point of the actuation mechanism. The coupler nut is attached to the end of a coupler and holds the adjusting screw. The adjusting screw is an adjustable set screw that connects the distal end of the coupler to the linkage anchor with an adjustable distance in between. For a given position of the actuator mechanism, adjusting the set screws can change the focal lengths of the lens units individually. In FIG. 2, the coupler nut and the adjusting screw for the two couplers are indicated by reference symbol 27a, 27b.

In use, the rotary cam 22 is rotated to the extent desired, in a clockwise or counterclockwise direction, by the user's finger stroking the exposed portion of the fingerwheel 21. As the surface of the rotary cam 22 passes under the cam follower 23, the cam follower moves in the forward-rearward direction. The cam follower 23 transfers its motion to the two couplers 24a, 24b simultaneously. In turn, each coupler 24a, 24b pivots about its respective coupler pivot 25a, 25b, and transfers the forward-rearward motion to the second ring assembly of the corresponding lens unit 11a, 11b.

Various preferred, alternative or optional features of the actuator mechanism are described below.

When the peripheral surface of the cam 22 has a cross-sectional shape such that the radial distance always increases with increasing rotation angle of the cam, the cam follower 23 will exert a bias force that urges the cam to self-rotate in the direction that decreases the radial distance. This results in undesirable instability of the cam and the cam follower. To prevent such instability, in preferred embodiments, the peripheral surface of the rotary cam 22 is provided with a series of steps. In one embodiment, each step is an arc centered at the rotation axis of the cam 22. Such a shape provides neutral stability when the cam follower rests on each step. In other embodiments, each step is a convex curve which is less convex than the arc, or a straight line, or a concave curve, such that the radial distance at the center of the step is smaller than the radial distances at the two ends of the step. Such shapes provide positive stability for the cam and the cam follower as it urges the cam follower toward the center of each step. The shape of the cam surface in the transition regions of adjacent steps is not important, so long as it does not create an unduly high barrier for the cam follower to move between the steps. The steps in the cam surface also improve operator feel of the positional steps of the rotary cam assembly.

In some embodiments, the shape of the rotary cam's outer surface is designed to provide uniform step size, meaning that a specific incremental angular rotation of the finger wheel always results in a specific change in the relevant optical parameter. In other embodiments, the shape is designed to provide non-uniform step sizes.

It is also possible for the outer surface of the cam to include a mixture of different shapes, e.g. having some sections with steps and some sections without steps, or different sections with different step shapes.

The above described cross-sectional shapes of the cam surface, some of which include a series of steps, are generally referred to as spiral-shaped. A strict spiral, in the mathematical sense, is not required; it is adequate instead for the outline of this shape to be defined, with reference to a rotational axis, by a plurality of relevant discrete points, each such relevant discrete point having a radial distance and an angle, and where (over a certain angular range) the relationship between the radial distances of angularly successive relevant discrete points is monotonic. For a cam surface with a series of steps, the relevant discrete points include the lowest point within each step (i.e. the point that has the shortest radial distance). For a cam surface that does not have steps, the function of radial distance vs angle for most points on its outline is monotonic.

Figure 6:
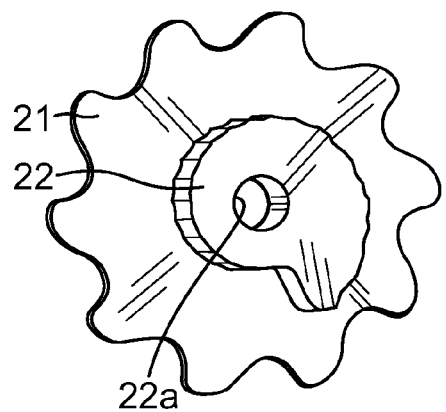
FIG. 6 illustrates the rotary cam assembly according to an alternative embodiment of the present invention.

For the cam 22 shown in FIGS. 3, 4 and 6, the radial distance of the cam surface generally increases from 0 degrees to nearly 360 degrees. Alternatively (less preferred), the cam can be shaped so that the radial distance increases within one angular range (e.g. 0 to 180 degrees), and then decreases in another angular range (e.g. 180 to 360 degrees). Such a shape is covered by the above definition of a spiral shape, even though it is less preferred because it does not utilize the full 360 degrees of angular range to provide radial distance adjustment.

In a preferred embodiment, a protrusion (hook) 22b is provided on the rotary cam 22, located near an end of the cam's intended maximum angular rotation, to prevent the cam follower 23 from "falling off" of the end of the cam surface. Thus, when the rotary cam is rotated to an extreme position, the engagement of the hook with the cam follower 23 prevents over-rotation of the rotary cam 22. In an alternative embodiment, to prevent over-rotation a protrusion is provided on the rotary cam 22, which engages the tip of one of the couplers (e.g. the first coupler 24a) as the rotary cam is rotated to an extreme position.

In a preferred embodiment, the proximate end of the first coupler 24a is fixedly attached to the cam follower 23, and the proximate end of the second coupler 24b rides on an outer surface of the cam follower 23. A flat surface may be provided in the cam follower 23 for the end of the second coupler to rest upon. In this embodiment, the first and second couplers 24a and 24b may be referred to as the master and slave couplers, respectively.

In an alternative embodiment (less preferred), the proximate ends of both couplers may be fixedly attached to the cam follower 23. Such an alternative structure requires the couplers 24a, 24b and/or the cam follower 23 to be slightly deformable.

In another alternative embodiment, the proximate end of neither coupler is fixedly attached to the cam follower 23. Rather, the cam follower 23 rests on the cam surface and is guided by a slot or other suitable structure to move up and down (in the perspective of FIG. 3), and the proximate ends of the two couplers 24a and 24b rest on the cam follower similar to the arrangement shown in FIG. 3.

Figure 5:
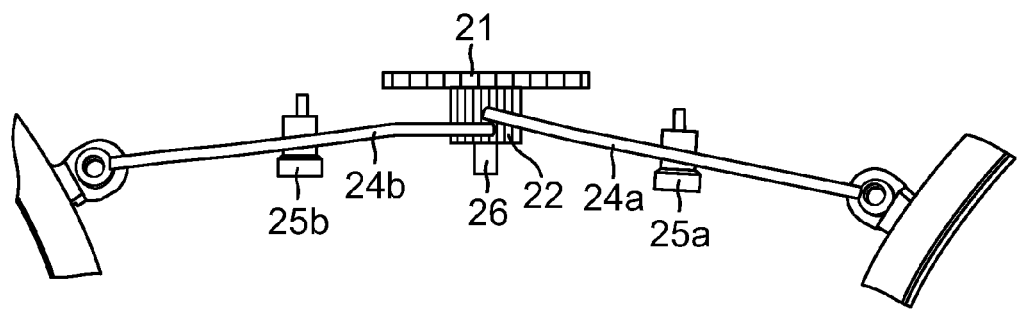
FIG. 5 is a rear view showing the actuator mechanism according to an alternative embodiment of the present invention.

In another alternative embodiment, the cam follower 23 may be provided in two parts, one part being located below the other, each being fixedly attached to the proximate end of one of the couplers 24a, 24b. The two parts collectively constitutes the cam follower. In yet another alternative embodiment (shown in FIG. 5), the tips of the couplers rest directly on the surface of the rotary cam 22. In this case, the tips of the couplers should have a suitable shape at their points of contact with the cam surface, and the tips may be considered a cam follower integrated with the couplers. The latter two embodiments are conceptually equivalent.

Other suitable cam follower structures may be used, so long as each functions to transfer the rotation of the rotary cam into the pivoting motion of the two couplers. In all of the above structures, the proximate end of each of the two couplers 24a, 24b is engaged with the cam follower, either by being fixedly attached to it or integrally formed with it, or by resting on its surface. All of the above structures are encompassed within the scope of the invention.

In one embodiment, the fingerwheel 21 is configured to provide tactile indexing, In addition to having a series of protrusions and recesses, one portion 21a of the fingerwheel may be provided with a different shaped protrusion or recess than the rest of the fingerwheel, as shown in FIG. 3. For example, this portion may be located in the front of the spectacle when the actuator mechanism adjusts the focal length to an intermediate value between the maximum and minimum values.

In an alternative embodiment, the fingerwheel 21 may be replaced by a linear gear rack mounted on the bridge and a gear wheel fixed to the rotary cam 22. As the linear gear rack slides along the bridge, the gear wheel is engaged to rotate and cause the rotary cam to rotary with it.

In the construction of the actuator mechanism, each part should be designed to handle the forces and torques required to actuate both lens units to maximum optical power. Additionally, the rotary cam should have a low coefficient of friction and adequate lubricity, and should be able to withstand the contact stresses to which it is exposed. The choice of materials for various parts may be important to ensure the smooth and reliable operation of the actuator mechanism. The rotary cam may be made of high performance plastic, like PEEK or Torlon, or other suitable materials. The fingerwheel 21 may be made of plastic, like PEEK or Delrin, or other suitable materials. The couplers may be made of metal, like stainless steel or other suitable materials. In a preferred embodiment, the rotary cams 22 is machined, or molded, from bearing grade PEEK.

It will be apparent to those skilled in the art that various modification and variations can be made in the actuator mechanism and related method of the present invention without departing from the spirit or scope of the invention. Thus, it is intended that the present invention cover modifications and variations that come within the scope of the appended claims and their equivalents.

What is claimed is:

1. An actuation mechanism for spectacles, the spectacles including two variable focus lens units and a bridge therebetween, each variable focus lens unit having a linkage anchor, the actuation mechanism comprising:
   a rotary cam mounted on the bridge and able to rotate around a rotation axis, the rotation axis being stationary with respect to the bridge, the rotary cam having a peripheral surface, wherein at least some points on the peripheral surface have radial distances, as measured from the rotation axis, that are different one from the other;
   a cam follower disposed in slidable contact with the peripheral surface of the rotary cam; and
   first and second elongated couplers, each pivotally mounted on the bridge, each having a proximate end engaged with the cam follower and a distal end coupled to the linkage anchor of a corresponding one of the lens units.

2. The actuation mechanism of claim 1, further comprising a manually operable fingerwheel affixed to and rotatable with the rotary cam.

3. The actuation mechanism of claim 2, wherein the fingerwheel is exposed by the bridge and accessible to a user, and wherein the fingerwheel defines a plurality of depressions on its exterior surface.

4. The actuation mechanism of claim 2, wherein the fingerwheel and the rotary cam are formed as a single piece.

5. The actuation mechanism of claim 2, wherein the finger wheel and the rotary cam define a through hole, and wherein the actuation mechanism further comprises a bearing shaft extending through the through hole.

6. The actuation mechanism of claim 1, wherein the rotary cam is located near a center of the bridge, and where the first and second couplers are of substantially equal length.

7. The actuation mechanism of claim 1, wherein a pivoting axis of each of the first and second couplers is located between the proximate and distal ends of the respective coupler and parallel to the rotation axis of the rotary cam.

8. The actuation mechanism of claim 1, further comprising first and second adjusting screws respectively connecting, each via an adjustable distance, the distal end of the first and second couplers to the corresponding linkage anchors.

9. The actuation mechanism of claim 1, wherein the rotary cam has a spiral shaped peripheral surface.

10. The actuation mechanism of claim 9, wherein the peripheral surface of the rotary cam defines a plurality of steps, and wherein for each step a radial distance at its center is equal to or smaller than radial distances at its two ends.

11. The actuation mechanism of claim 1, wherein the peripheral surface of the rotary cam defines a protrusion for engaging the cam follower, or the proximate end of the first or second coupler, when the rotary cam is rotated to an extreme position.

12. The actuation mechanism of claim 1, wherein the cam follower is attached to the proximate end of the first coupler, and wherein the proximate end of the second coupler rests slidably on the cam follower.

13. The actuation mechanism of claim 12, wherein cam follower defines a surface on which the proximate end of the second coupler rests.

14. The actuation mechanism of claim 1, wherein the cam follower includes two parts, each being correspondingly attached to the proximate end of either the first, or the second, coupler.

15. The actuation mechanism of claim 1, wherein the rotary cam is formed of PEEK or Torlon.

* * * * *